US006163468A

United States Patent [19]

Barnes

[11] Patent Number: 6,163,468

[45] Date of Patent: Dec. 19, 2000

[54] START UP CIRCUITS AND BIAS GENERATORS

[75] Inventor: William Bryan Barnes, Bristol, United Kingdom

[73] Assignee: STMicroelectronics Limited, Bristol, United Kingdom

[21] Appl. No.: 09/302,313

[22] Filed: Apr. 29, 1999

[30] Foreign Application Priority Data

May 1, 1998 [GB] United Kingdom .................... 9809431

[51] Int. Cl.[7] ...................................................... H02M 7/00

[52] U.S. Cl. ................................................................ 363/49

[58] Field of Search .............................. 363/49; 323/313, 323/314, 315, 316; 327/535, 538, 539

[56] References Cited

U.S. PATENT DOCUMENTS

| | | | |
|---|---|---|---|
| 5,109,187 | 4/1992 | Guliani | 323/313 |
| 5,155,384 | 10/1992 | Ruetz . | |
| 5,243,231 | 9/1993 | Baik . | |
| 5,329,246 | 7/1994 | Mahabadi | 330/267 |
| 5,404,096 | 4/1995 | Thiel | 323/312 |
| 5,448,158 | 9/1995 | Ryat | 323/315 |
| 5,519,347 | 5/1996 | Kim | 327/143 |
| 5,604,467 | 2/1997 | Matthews | 331/176 |
| 5,642,037 | 6/1997 | Malherbe | 323/316 |
| 5,744,999 | 4/1998 | Kim et al. | 327/543 |

FOREIGN PATENT DOCUMENTS

| | | | |
|---|---|---|---|
| 0 515 065 A1 | 5/1992 | European Pat. Off. | G05F 3/26 |

*Primary Examiner*—Matthew Nguyen

*Attorney, Agent, or Firm*—Theodore E. Galanthay; Allen, Dyer, Doppelt, Milbrath & Gilchrist, P.A.

[57] ABSTRACT

A start-up circuit applies a start-up current to a current generator. The start-up circuit includes an application circuit for applying the start-up current to the current generator and an ensuring circuit ensuring that the current generator is in a predetermined stable state before the start-up current is applied thereto. The ensuring circuit prevents a flow of current in the current generator prior to application of the start-up current so that the stable state is one in which current is not conducting.

45 Claims, 4 Drawing Sheets

START UP CIRCUITS AND BIAS GENERATORS

FIELD OF THE INVENTION

The present invention relates to electronic circuits, and, more particularly, to a start-up circuit for a bias generator.

BACKGROUND OF THE INVENTION

Proportional to absolute temperature (PTAT) bias generators are well known. In general, PTAT generators have two stable states—a desired state and a state in which all the currents are zero. To ensure that the PTAT generator has the desired state when the currents are greater than zero, a separate start-up circuit is provided. An example of a known PTAT generator is shown in FIG. 1 and will now be described.

The PTAT generator is referenced by reference numeral 2. The PTAT generator 2 has a first pair of P channel field effect transistors (FETs) formed by a first P channel transistor 6 and a second P channel transistor 8. The first pair of transistors 6 and 8 are a matched pair. In other words, the two P channel transistors have the same general characteristics. The gates 10 and 12 of the first pair of transistors 6 and 8 are connected. The gate 10 and drain d of the first P channel transistor 6 are connected to each other. The sources s of the first and second transistors 6 and 8 are connected to a voltage supply.

The PTAT generator 2 has a second pair of N channel transistors including a third N channel transistor 16 and a fourth N channel transistor 18. The second pair of transistors 16 and 18 are also a matched pair of transistors. The drain d of the third N channel transistor 16 is connected to the drain d of the first P channel transistor 6. Likewise, the drain d of the fourth N channel transistor 18 is connected to the drain d of the second P channel transistor 8. The gates 20 and 22 of the third and fourth N channel transistors 16 and 18 are connected to each other. The drain d and gate 22 of the fourth transistor 18 are connected together.

A first diode 28 is connected between the source s of the third N channel transistor 16 and ground. The source s of the fourth transistor 18 is connected to one end of a resistor 32. A second diode 30 is connected between the other end of the resistor 32 and ground. The first diode 28 is relatively small while the second diode 30 is relatively large. A start-up current from a start-up circuit (not shown) is applied via node 42. The bias current output from the PTAT generator is taken from node 27, which is between the drain d of the second P channel transistor and the drain d of the fourth N channel transistor 18.

The operation of the PTAT generator 2 will now be described. If no start-up current is applied to the PTAT generator 2 when the voltage supply is turned on, the PTAT circuit may be in an unknown state and not in a desired stable state. In use, the PTAT generator 2 should be in the stable state when current flows. In the case when no start-up current is applied, the initial voltage at node 42 effectively will determine the state of the PTAT generator 2. The voltage at node 42 can initially be high, low or in between these values.

If the voltage at node 42 is initially high, then the first pair of P channel transistors 6 and 8 will be off as a high voltage is applied to their gates 10 and 12. This in turn means that, as the second transistor 8 is off, a low voltage is applied to the gates 20 and 22 of the third and fourth N channel transistors 16 and 18. These two N channel transistors 16 and 18 will therefore also be off. Accordingly, the PTAT generator 2 is in a state where no current flows.

However, if the voltage at node 42 is initially low, then a low voltage is applied to the gates 10 and 12 of the first and second P channel transistors 6 and 8. These two transistors 6 and 8 are therefore turned on. As the second transistor 8 is on, there will be a voltage applied to the gates 20 and 22 of the third and fourth N channel transistors 16 and 18. The third and fourth N channel transistors 16 and 18 are therefore both on. A current will therefore flow through the first transistor 6, the third transistor 16 and the first diode 28. Likewise a current will flow through the second transistor 8, the fourth transistor 18, the resistor 32 and the second diode 30. The PTAT generator 2 will therefore be in a stable state when current flows.

The desired stable state, the four transistors 6, 8, 16 and 18 will all be conducting at the same time. If the voltage at node 42 is initially neither low nor high, the state of the PTAT generator is difficult to predict, and some current may be flowing. The application of a start-up current to node 42 ensures that the PTAT generator will be in the stable state when current flows. The current which is applied is such that the node 42 is momentarily pulled low, regardless of the initial voltage at this node 42 when the voltage supply is first applied to the PTAT generator 2.

The resistance of the resistor 32 will depend on the temperature, and as the current provided by the PTAT generator 2 is related to the resistance of the resistor 32, compensation for variations in temperature will be provided. As the first diode 28 is relatively small compared to the second diode 30, this compensates for the presence of the resistor 32 so that the current on each side of the PTAT generator 2 can reach an equilibrium. An equilibrium state is achieved when the current on each side of the PTAT generator 2 is the same. The arrangement of a resistor and a large diode matching a small diode reaches equilibrium such that current flowing is proportional to absolute temperature.

In conventional analog designs, this start-up current will be provided by a fixed current source, such as a permanently conducting MOSFET or JFET device providing a weak current. The start-up current is provided until the current provided by the PTAT circuit exceeds that from the start-up current source. However, this type of start-up circuit is disadvantageous in that either the start-up circuit provides a large current which consumes excessive power, or the start-up circuit provides a small current which requires a physically large device which is wasteful of space, particularly if the start-up circuit and PTAT generator are part of an integrated circuit.

SUMMARY OF THE INVENTION

It is an object of the present invention to provide a start-up circuit which avoids or at least mitigates the disadvantages of the known start-up circuits.

A start-up circuit of the invention applies a start-up current to a current generator. The start-up circuit includes a circuit for applying a start-up current to the current generator, and a circuit for ensuring that the current generator is in a predetermined stable state before the start-up current is applied thereto. Embodiments of the present invention may therefore have the advantage that prior to the application of the start-up current, the bias generator will be in a known, disabled state.

Preferably, the ensuring circuit is arranged to prevent the flow of current in the current generator prior to the application of the start-up current so that the stable state is one in which no current flows. The current generator may include at least one transistor, and the ensuring circuit may be arranged to apply a voltage to a control terminal of the at least one transistor to switch the transistor off. In this way, it can be ensured that the current generator is in the predetermined stable state where no current flows.

The ensuring circuit may include at least one transistor. Preferably, the at least one transistor of the ensuring circuit is connected to the at least one transistor of the current generator. Thus, the at least one transistor of the ensuring circuit can be arranged to ensure that the at least one transistor of the current generator is in a predetermined state so that the current generator can be in the predetermined stable state prior to the application of the start-up current.

Preferably, the current generator includes two pairs of transistors and the ensuring circuit includes two transistors. One transistor ensures one of the pairs of transistors is switched off prior to the application of the start-up current, and the other transistor ensures that the second pair of transistors is switched off prior to the application of the startup current.

The circuit for applying the start-up current may include a capacitive element. In use, when the ensuring circuit is ensuring that the current generator is in the predetermined stable state, the capacitive element may be charged and the start-up current may be provided when the capacitive element is discharged. The capacitive element may include a capacitor or a transistor connected as a capacitor.

Alternatively, the circuit for applying the start-up current may include a transistor having a control terminal. The control terminal is arranged to receive a start signal, wherein the start signal has one state when the ensuring circuit ensures that the current generator is in the predetermined state, and a different state when the start-up current is applied to the current generator.

Preferably, the operation of the circuit is controlled by a control signal which has one state when the ensuring circuit ensures that the current generator is in the predetermined stable state, and a different state when the start-up current is applied.

Preferably, a circuit is provided for preventing the applying circuit from continuing to apply the start-up current to the current generator when the current generator is in a stable state in which current flows. When the current generator is in the stable state when current flows, there is no need to continue to apply the starting current.

The preventing circuit may be arranged to stop application of the start-up current a predetermined time after the start-up current was initially applied. Alternatively, the preventing circuit may be arranged to detect when the current generator is in a stable state in which current flows, and to stop application of the start-up current once it has been detected that the current generator is in the stable state in which current flows.

According to a second aspect of the present invention, a current bias generator generates a bias current. The current bias generator includes a first pair of transistors of a first polarity, a second pair of transistors of a second polarity, an output for providing a bias current, and a resistive element. One of the first pair of transistors and one of the second pair of transistors are connected in series. The other of the first pair of transistors and the other of the second pair of transistors are arranged in series. At least one of the first and second pairs of transistors are unmatched. The resistive element may preferably be arranged in series with a higher gain transistor of a pair so that a state of equilibrium can be achieved, and the output is provided in one of the series paths.

This arrangement has the advantage that the diodes of the known arrangement can be omitted with the function of those diodes being performed by the at least one mismatched pair of transistors. This is advantageous in that in some integrated circuits diodes are poorly characterized so that it can be time consuming to design a current generator using diodes which achieves the desired performance. Additionally, the increase of current with temperature will be less than in the PTAT generator which allows good performance at high temperatures without the excessive current given by PTAT biasing.

The resistive element may include a resistor or a transistor. The transistor may, in use, be fully conducting. Preferably, the output is in the series path having the resistive element. The control terminal of one of the transistors of one of the first and second pairs may be connected to the series path containing that transistor and provides the output.

Preferably, a control terminal of a transistor of the other of the first and second pairs of transistors is connected to the series path containing that transistor which is different to the series path providing the output. Preferably, an input is provided to receive a start-up current. The input is in the series path which does not provide the output.

BRIEF DESCRIPTION OF THE DRAWINGS

For a better understanding of the present invention and as to how the same may be carried into effect, reference will now be made by way of example to the accompanying drawings in which.

.

Figure 2:
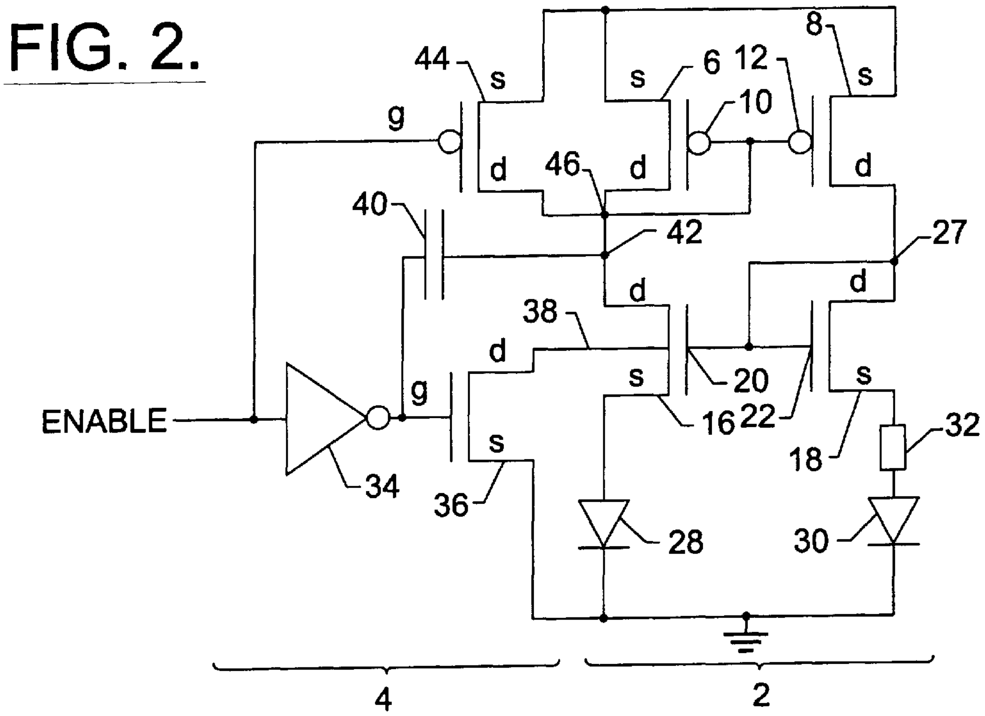
Figure 3:
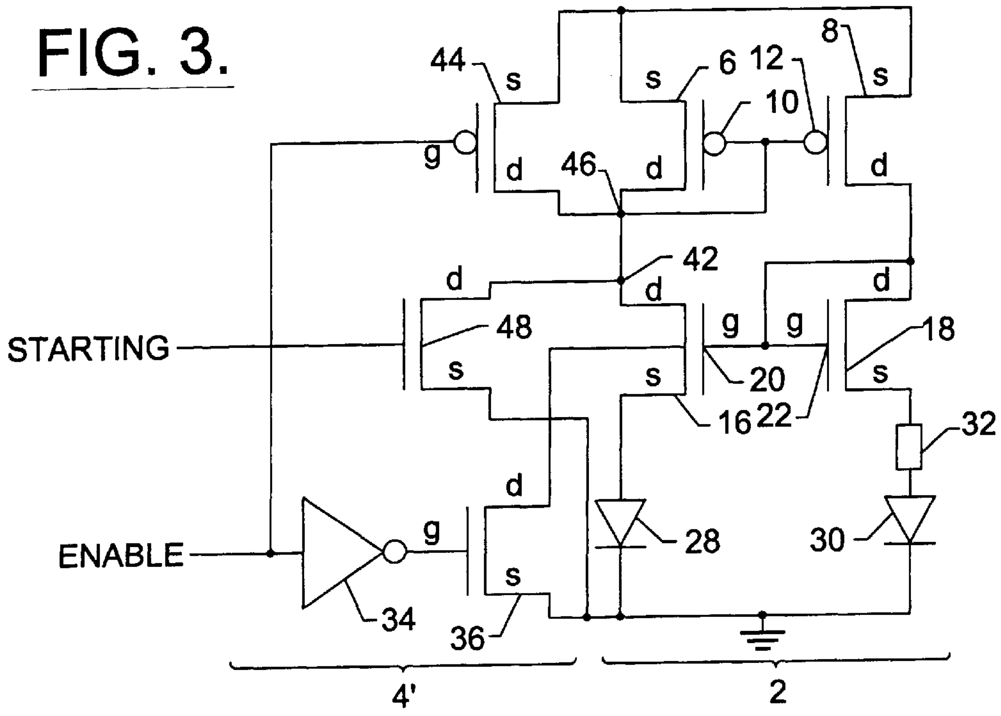
Figure 4:
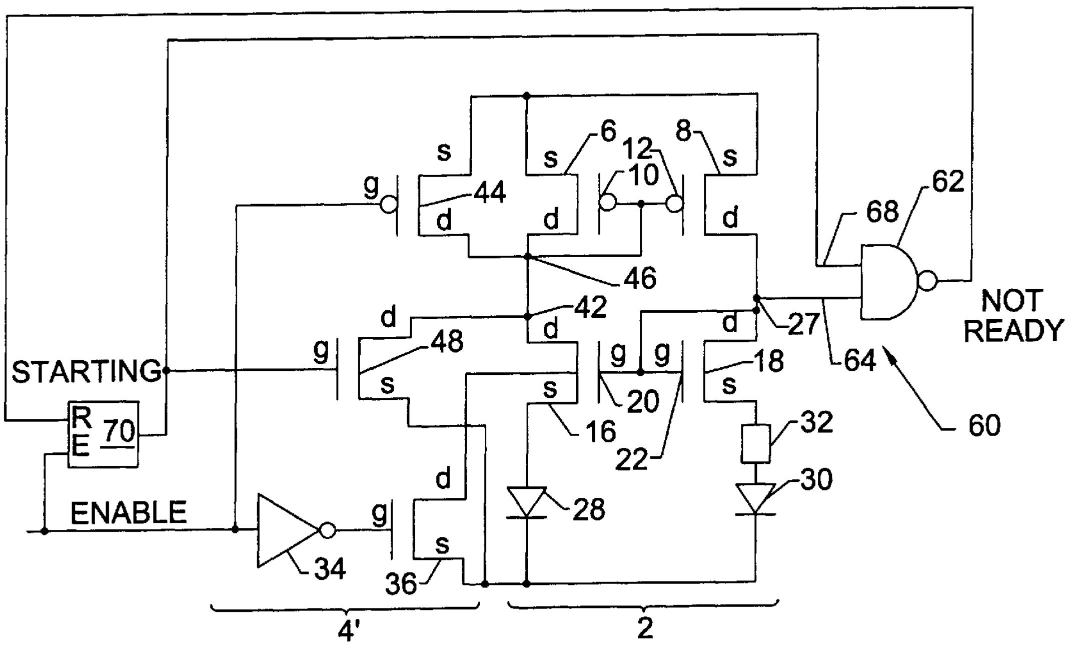
Figure 5:
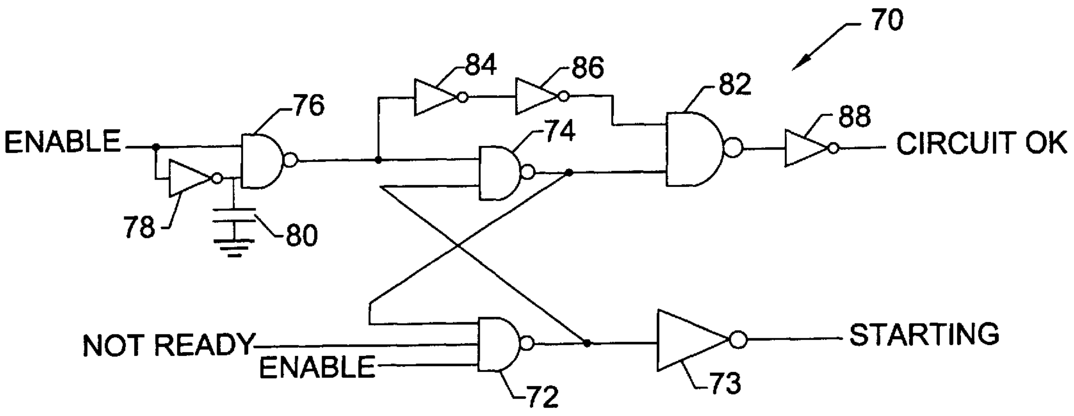
Figure 6:
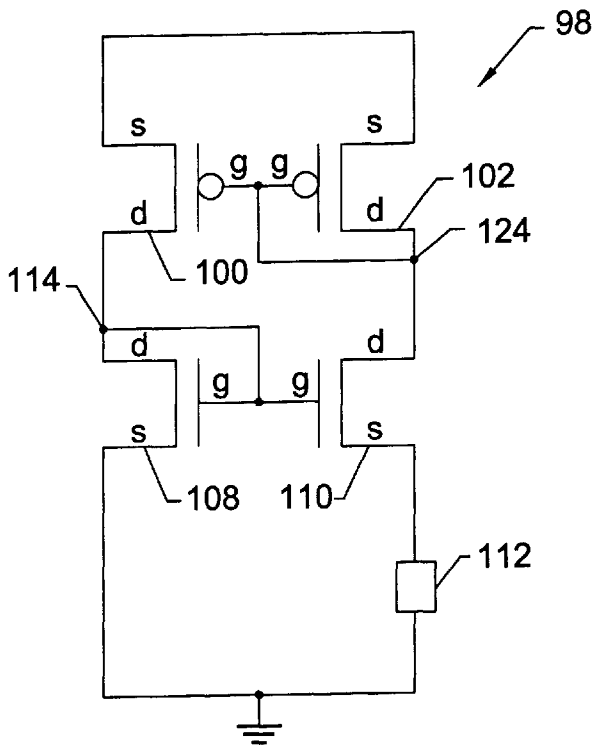
Figure 7:
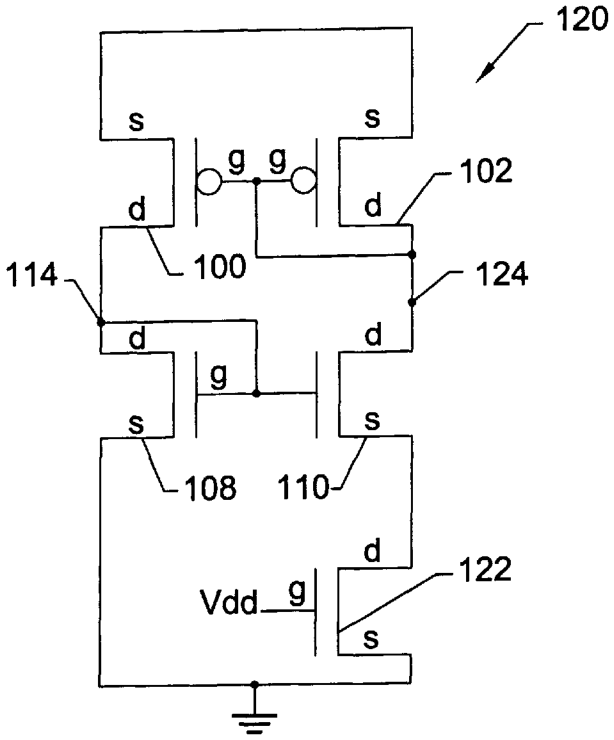

FIG. 2 shows a PTAT generator with a start-up circuit, according to the present invention;

FIG. 3 shows a PTAT generator with a second start-up circuit, according to the present invention;

FIG. 4 shows the PTAT generator and start-up circuit of FIG. 3 with a start-up detection circuit;

FIG. 5 shows part of the start-up detection circuit of FIG. 4 in detail;

FIG. 6 shows a first bias generator, according to the present invention; and FIG. 7 shows a second bias generator, according to the present invention.

DETAILED DESCRIPTION OF THE PREFERRED EMBODIMENTS

Reference will now be made to FIG. 2 which shows a PTAT generator 2 with a start-up circuit 4 embodying the present invention. The PTAT generator 2 is the same as the known PTAT generator shown in FIG. 1 and, accordingly, will not be described again. The reference numerals used in FIG. 1 for the PTAT generator 2 are also used in FIG. 2.

The start-up circuit 4 comprises an inverter 34 which is arranged to receive an ENABLE signal. The output of the inverter 34 is connected to the gate g of a fifth N channel transistor 36. The source s of the fifth N channel transistor is connected to ground while the drain d of that transistor 36 is connected to the gates 20 and 22 of the third and fourth N channel transistors 16 and 18. The output of the inverter 34 is also connected to a capacitor 40. The capacitor 40 is arranged between the output of the inverter 34 and the node 42 of the PTAT generator 2. The node 42 is between the drain of the third N channel transistor 16 and the drain of first P channel transistor 6 of the PTAT generator 2.

The ENABLE signal is also supplied to the gate g of a sixth P channel transistor 44. The source s of the sixth P channel transistor 44 is connected to the voltage supply while the drain d of that transistor 44 is connected to node 46. Node 46 is between node 42 and the drain d of the first transistor 6.

The operation of the circuit shown in FIG. 2 will now be described. Initially, when the supply voltage is applied to the PTAT generator 2, the ENABLE signal will be low. This means that the output of the inverter 34 will be high so that a relatively high voltage is applied to the gate g of the fifth transistor 36 which turns this transistor on. This will tend to pull the gates 20 and 22 of the third and fourth N channel transistors 16 and 18 to ground. The high output of the inverter 34 also causes charge to accumulate in the capacitor 40.

The low ENABLE signal is also applied to the gate g of the sixth transistor 44, thus turning this transistor on. This will ensure that there is a voltage at node 46 which means that a relatively high voltage is applied to the gates 10 and 12 of the first and second transistors 6 and 8. These transistors 6 and 8 will therefore be off. The PTAT generator 2 is thus in a stable state when no current flows.

When the ENABLE signal changes from having a low level to a high level, the output of the inverter 34 is now low. A low voltage is therefore applied to the gate g of the fifth N channel transistor 36. This transistor 36 is therefore turned off. Accordingly, the fifth transistor 36 will no longer provide a path to ground so that a high voltage can now be applied to the gates 20 and 22 of the third and fourth transistors 16 and 18. The ENABLE signal, which is high, is applied to the gate g of the sixth P channel transistor 44 which is also turned off. Accordingly, the node 46 will no longer receive a voltage from the voltage supply via the sixth transistor 44. This means that the node 46, and, hence, node 42, can be low.

As the capacitor 40 no longer receives the high input from the output of the inverter 34, the capacitor 40 will discharge. This gives rise to a current pulse at node 42 which pulls that node down long enough to cause the first and second transistors 6 and 8 to turn on. This in turn means that the third and fourth transistors 16 and 18 will also be turned on. Once this occurs, the PTAT generator 2 will be in the stable state when current flows. In particular, no further start-up current needs to be applied to the node 42 in order to maintain the PTAT generator 2 in the stable state when current flows.

In one modification to the embodiment shown in FIG. 2, the capacitor 40 is replaced by a P channel transistor which functions as a capacitor. In this modification, the supply voltage should be greater than twice the threshold value of the transistor which replaces the capacitor. The large capacitance from the node 42 to ground may degrade the power supply rejection of the circuit. If so, the start-up circuit 4 may be arranged to adopt an open circuit configuration once the PTAT generator 2 has been started and is in the desired stable state.

Figure 1:
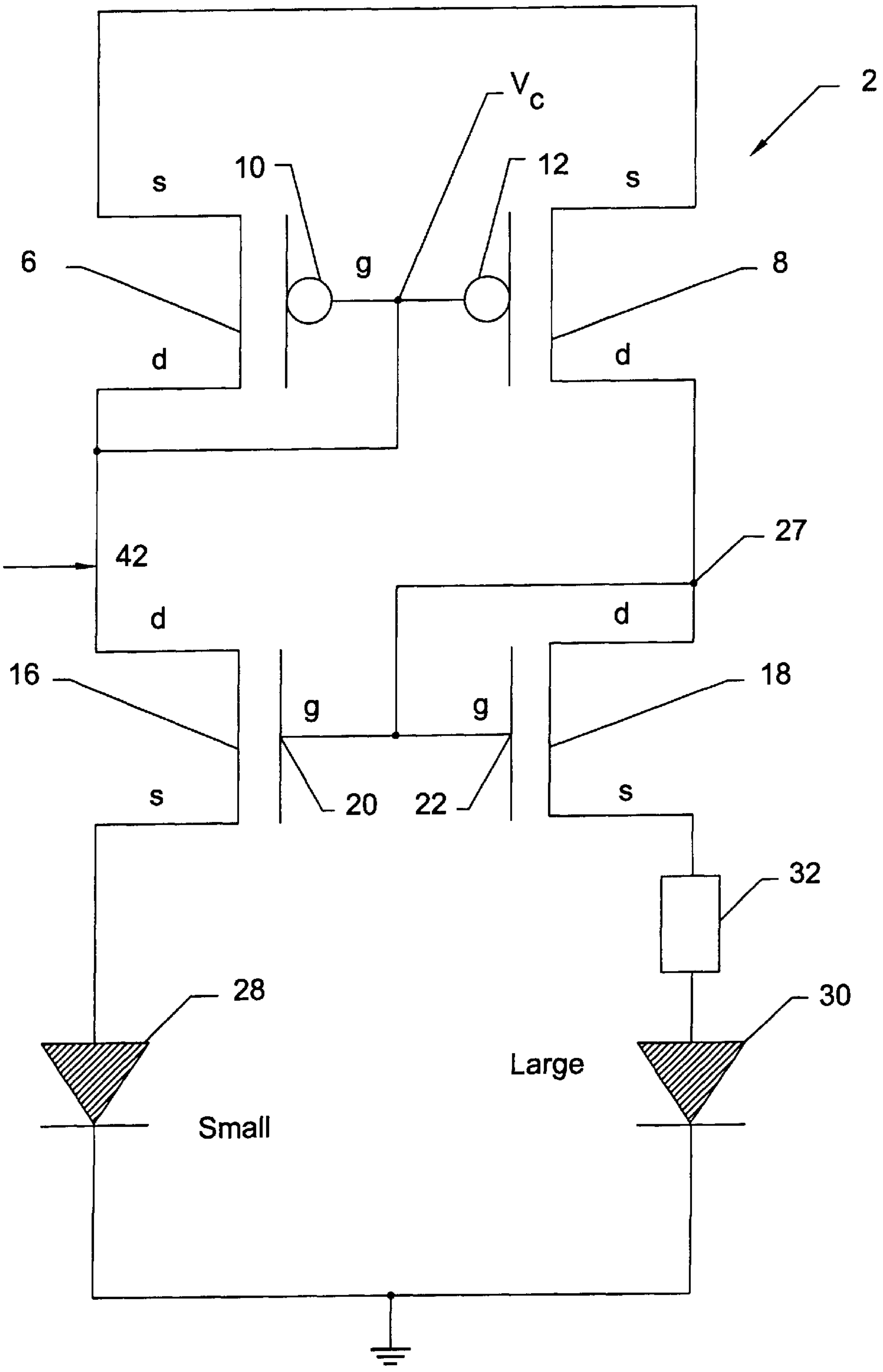
FIG. 1. (PRIOR ART)
FIG. 1 shows a PTAT generator, according to the prior art.

A second PTAT generator 2 with a start-up circuit embodying the present invention will now be described with reference to FIG. 3. The PTAT generator 2 is again the same as the PTAT generator 2 shown in FIG. 1 and, accordingly, will not be described in detail again. The same reference numerals which are used in FIG. 1 are used in FIG. 3.

The start-up circuit 4' of the embodiment shown in FIG. 3 is similar to the start-up circuit 4 of FIG. 2. However, the capacitor 40 of FIG. 2 is not present. Instead, a seventh N channel transistor 48 is provided. The gate g of the seventh transistor 48 receives a STARTING signal. The drain d of the seventh transistor 48 is connected to node 42 of the PTAT generator 2. The source s of the seventh transistor 48 is connected to ground.

The operation of the circuit shown in FIG. 3 will now be described. As with the start-up circuit 4 of FIG. 2, when the ENABLE signal is low, the output of the inverter 34 is high so that the fifth transistor 36 is turned on, thus keeping the third and fourth transistors 16 and 18 turned off. The low ENABLE signal also causes the sixth transistor 44 to be turned on which keeps the first and second transistors 6 and 8 turned off. As with the start-up circuit shown in FIG. 2, the PTAT generator 2 is initially maintained in the stable state when no current flows. The STARTING signal will be initially low so that the seventh transistor 48 is turned off.

When the ENABLE signal is high, the output of the inverter 34 is low so that the fifth transistor 36 is turned off which means that the third and fourth transistors 16 and 18 can be turned on. The sixth P channel transistor 44 will also be off so that the first and second transistors 6 and 8 can be turned on. The STARTING signal will also be high so that the seventh N channel transistor 48 is switched on. This will pull node 42 and hence node 46 down low. As discussed hereinbefore, this will cause the first and second transistors 6 and 8, and hence the third and fourth transistors 16 and 18 to turn on. The seventh transistor 48 is fully turned on by the STARTING signal.

In embodiments of the invention, the start-up current will only flow for a short period of time and, accordingly, may be much greater than the normal operating current of the PTAT generator 2. However, it should be ensured that the PTAT generator 2 can operate with the level of the start-up current. As with the embodiment shown in FIG. 2, once the steady state with current flowing has been achieved, the start-up current is no longer required to maintain that steady state.

If the time for which the start-up current needs to be applied to ensure that the PTAT generator 2 is in the desired state is known, the STARTING signal with the high level can be applied for this time and then removed. If the time for which the start-up signal needs to be applied to ensure that the PTAT generator 2 is in the desired state is not known, a circuit for detecting if the PTAT generator is in the desired state may be required. Such a circuit is shown in FIG. 4.

FIG. 4 shows a PTAT generator 2 with a start-up circuit 4' and a start-up detection circuit 60. The PTAT generator is the same as that shown in FIG. 1 and, accordingly, will not be described in detail. The same reference numerals used in FIG. 1 for the PTAT generator 2 will also be used in FIG. 4. The start-up circuit 4' of FIG. 4 is the same as the start-up circuit 4' of FIG. 3 and, accordingly, will not be described in detail. The same reference numerals used in FIG. 3 for the start-up circuit 4' will also be used in FIG. 4.

The start-up detection circuit 60 includes a two input NAND gates 62. One input 64 is connected to node 27 of the PTAT generator 2, which provides the bias current output. The node 27 lies between the drain of the second P channel transistor 8 and the drain of the fourth N channel transistor 18. The second input 68 of the NAND gate 62 receives the STARTING signal which is applied to the gate g of the seventh N channel transistor 48. The output of the NAND gate 62 is connected to one of two inputs of control circuit 70. The RESET input of the control circuit 70 is received from the output of the NAND gate 62. The other input of the circuit 70 represents the set input and receives the ENABLE signal which is applied to the inverter 34 and the gate g of the sixth P channel transistor 44.

The operation of the start-up detection circuit 60 will now be described. The first input 64 to the NAND gate 62 will initially be low when the ENABLE signal is low since the PTAT generator 2 is in the stable state when no current flows. Accordingly, node 27 is at a low voltage. As the STARTING signal is low, the second input 68 to the NAND gate 62 will also be low. The output of the NAND gate 62 will therefore be high. The output of the NAND gate 62 is the NOT READY signal. A high value represents the not ready state and a low value represents the ready state when the desired stable state has been achieved.

When the ENABLE signal goes high and the STARTING signal goes high, the PTAT generator 2 will in response to the start-up current on node 46 adopt the stable state when current flows in the PTAT generator 2. Once that stable state has been achieved, the NAND gate 62 will receive a high input at its first input 64 from node 66. As the STARTING signal is high, the second input 68 is also high and the output of the NAND gate 62 will be low.

Before the PTAT generator 2 has settled to the stable state where current flows, the node 27 will be low so that the first input of the NAND gate 62 will receive a low input. The output of the NAND gate 62 will therefore be high. As the output of the NAND gate 62 is only low when there is a current flowing through node 27, which is indicative that the PTAT generator is in the desired state, and when the STARTING signal is high, it can be determined when the desired stable state has been achieved and that the start-up current is no longer required. When the output of the NAND gate 62 is low, this low signal is input to control circuit 70 which causes the STARTING signal to have the low level. The seventh transistor 48 is turned off so a start-up current is no longer applied to node 42 and hence node 46.

Reference is now made to FIG. 5 which shows an embodiment for the control circuit 70 shown in FIG. 4. The control circuit 70 includes a first NAND gate 72 which has three inputs. One input receives the NOT READY signal output by the NAND gate 62 of the start-up detection circuit 60. The second input receives the ENABLE signal whilst the third input receives the output from a second NAND gate 74. The output of the first NAND gate is connected to the input of a first inverter 73, the output of which provides the STARTING signal.

The second NAND gate 74 has two inputs. One input is connected to the output of the first NAND gate 72 while the second input is connected to the output of a third NAND gate 76. The third NAND gate 76 has two inputs. The first input receives the ENABLE signal. The second input receives the output of a second inverter 78. The second inverter 78 receives at its input the ENABLE signal. Thus, the third NAND gate 76 receives the ENABLE signal and its inverse. A capacitor 80 is connected between the output of the second inverter 78 and ground.

A fourth NAND gate 82 is provided which has two inputs. One input is connected to the output of the second NAND gate 74. The second input receives the output of the third NAND gate 76 via third and fourth inverters 84 and 86 connected in series. The output of the fourth NAND gate 82 is connected to the input of a fifth inverter 88, the output of which provides a CIRCUIT OK signal.

The operation of the control circuit 70 shown in FIG. 5 will now be described. When the ENABLE signal is low, the output of the NAND gate 62 of the circuit shown in FIG. 4 which provides the NOT READY signal will be high. As the ENABLE signal is low, the output of the first NAND gate 72 will be high. The output of the first inverter 73 which receives the output of the first NAND gate 72 is therefore low. Accordingly, the STARTING signal is low.

The output of the third NAND gate 76 will also be high in that the ENABLE signal is low. The fourth NAND gate 82 receives a low output from the second NAND gate 76 and a high input from the third NAND gate 76 via the second and third inverters 84 and 86. The output of the fourth NAND gate 82 is therefore high. The output of the inverter 88 is therefore low indicating that the PTAT generator 2 is not in the steady state in which current flows.

When the ENABLE signal becomes high, the NOT READY signal is initially high indicating that the desired stable state has not been achieved but will become low once the desired steady state has been achieved. Initially, when the ENABLE signal is high and the NOT READY signal is high, the output of the first NAND gate 72 is low, the output of the third NAND gate 76 is high, the output of the second NAND gate 74 is high and the output of the fourth NAND gate 82 is low. Accordingly, the CIRCUIT OK signal provided by the fifth inverter 88 is high, again indicating that the PTAT generator 2 is not in the stable state when current flows. As the output of the first inverter 73 is low, the STARTING signal will be high.

When the ENABLE signal is high and the NOT READY signal is low, the output of the third NAND gate 76 is high, the output of the first NAND gate 72 is high, the output of the second NAND gate 74 is low, and the output of the fourth NAND gate 82 is high. The CIRCUIT OK signal is therefore low indicating that the PTAT generator 2 is in the desired stable state. The STARTING signal is now low. With the start-up detection circuit 62 shown in FIG. 4 and 5, it is possible to determine when the PTAT generator is in the desired stable state and, accordingly, that the start-up current is no longer needed.

Reference will now be made to FIG. 6 which shows a bias generator 98 embodying the present invention. The bias generator 98 includes a first pair of P channel transistors formed by a first transistor 100 and a second transistor 102. The first and second transistors 100 and 102 are a matched pair. The source of each of the first and second transistors 100 and 102 is connected to the voltage supply. The gates g of the first and second transistors are connected together. The drain and gate of the second transistor 102 are connected to each other.

A second pair of N channel transistors are also provided which include a third transistor 108 and a fourth transistor 110. The third and fourth transistors 108 and 110 are not a matched pair. In particular, the third transistor 108 is smaller than the fourth transistor 110. The drain d of the third transistor 108 is connected to the drain of the first P channel transistor 100. The drain d of the fourth transistor 110 is connected to the drain d of the second P channel transistor 102. The source s of the third N channel transistor 102 is connected directly to ground while the source s of the fourth N channel transistor 110 is connected to ground via a resistor 112.

The bias generator 98 of FIG. 6 is arranged to receive a start-up current via node 114. The start-up current may be provided by any known start-up current circuit or any start-up current circuit embodying the present invention. When the start-up current is received, the third and fourth transistors 108 and 110 will be switched on, but since these transistors are not a matched pair, the third transistor will be conducting less on than the fourth transistor 110.

The degree to which the first and second transistors 100 and 102 are turned on will depend on how low the voltage is at the output node 124 for the bias current. The lower the voltage, the more quickly these transistors will be switched on. In order to provide a bias current, the first and second transistors will be switched on to a certain degree. The resistor 112 allows an equilibrium to be achieved in that the current flowing through the resistor 112 in combination with transistor 110 balances the current flowing through the third transistor 108.

The bias generator shown in FIG. 6 operates in a similar manner to that shown in FIG. 1. It should be appreciated that it is not of importance as to which transistor of each pair has it gate connected to its drain, provided that one transistor of each pair has it gate connected to its drain, one of the transistors is connected on the input side, and one of the transistors is on the output side.

A second bias generator 120 embodying the present invention will now be described with reference to FIG. 7. The second bias generator 120 embodying the present invention is similar to the first bias generator 98 shown in FIG. 6. The difference between the second bias generator 120 shown in FIG. 7 and the first bias generator 98 shown in FIG. 6 is that the resistor 112 of the first bias generator 98 has been replaced by a fifth N channel transistor 122. The remaining components of the second bias generator 120 are the same as those of the first bias generator and are referenced by the same reference numerals.

The fifth transistor 122 has its drain d connected to the source s of the fourth transistor 122 and its source is connected directly to ground. The gate g of the fifth transistor 122 is connected to the voltage source or any other suitable bias point. The fifth transistor is arranged in use to be fully turned on. An advantage of replacing the resistor of the bias generator 98 of FIG. 6 with a transistor is that the transistor takes up less space than a resistor in an integrated circuit. Additionally, in some embodiments of the present invention, it may be advantageous to be able to implement all of a circuit using just transistors. The bias generator of FIG. 7 may receive a start-up current via node 114 from any convention circuit or any of the start-up circuits described hereinbefore.

The use of the fifth transistor 122 means that the bias current provided at node 124 has some correlation with temperature in that the fifth transistor 122 responds in a similar manner to changes in temperature as the first to fourth transistors 100-110. However, the independence of the supply and the output bias current has been reduced in that the effective resistance of the fifth transistor, unlike the resistor 112 used in the embodiment shown in FIG. 6, is dependent on its gate voltage and hence on the supply voltage Vdd.

The arrangements shown in FIGS. 6 and 7 may, but not necessarily, be used in conjunction with the start-up circuits shown in FIGS. 2 to 5. Embodiments of the present invention may be implemented by discrete components, or more preferably, in an integrated circuit.

It is preferred that the transistors used in embodiments of the present invention are MOSFETs. However, any other type of suitable type of transistor, such as bipolar transistors, can be used. It should be noted that it is also possible to implement embodiments of the present invention with transistors of the opposite polarity to those used in the preferred embodiments of the present invention.

That which is claimed is:

1. A current generator and a start-up circuit connected thereto and comprising:

an application circuit consuming power while applying a start-up current to the current generator and consuming substantially no power otherwise;

an ensuring circuit ensuring that the current generator is in a predetermined stable state before the start-up current is applied thereto; and a prevention circuit for stopping application of the start-up current to the current generator after the start-up current is initially applied so that said application circuit then consumes substantially no power.

2. A current generator and a start-up circuit according to claim 1, wherein said ensuring circuit prevents a flow of current in the current generator prior to application of the start-up current so that the stable state is one in which current is not flowing.

3. A current generator and a start-up circuit according to claim 2 comprising at least one transistor having a gate; wherein said ensuring circuit applies a voltage to the gate of said at least one transistor so that said transistor is not conducting.

4. A current generator and a start-up circuit according to claim 1, wherein said ensuring circuit comprises at least one transistor.

5. A current generator and a start-up circuit according to claim 1 comprising at least one transistor having a gate; wherein said ensuring circuit applies a voltage to the gate of said at least one transistor so that said transistor is not conducting, wherein said ensuring circuit comprises at least one transistor connected to said at least one transistor of the current generator.

6. A current generator and a start-up circuit according to claim 1 comprising a first and second pair of transistors; wherein said ensuring circuit comprises a first and second transistor, wherein said first transistor ensures said first pair of transistors is conducting prior to application of the start-up current and said second transistor ensures that said second pair of transistors is not conducting prior to application of the start-up current.

7. A current generator and a start-up circuit according to claim 1, wherein said application circuit comprises a capacitive element.

8. A current generator and a start-up circuit according to claim 7, wherein said ensuring circuit ensures that the current generator is in the predetermined stable state when in operation; wherein said capacitive element is charged and the start-up current is provided when said capacitive element is discharged.

9. A current generator and a start-up circuit according to claim 7, wherein said capacitive element comprises a capacitor.

10. A current generator and a start-up circuit according to claim 7, wherein said capacitive element comprises a transistor.

11. A current generator and a start-up circuit according to claim 1, wherein said application circuit comprises a transistor having a gate for receiving a start signal, the start signal has a first state when said ensuring circuit ensures that the current generator is in the predetermined state, and a second state when the start-up current is applied to the current generator.

12. A current generator and a start-up circuit according to claim 1, wherein operation of the start-up circuit is controlled by a control signal having a first state when said ensuring circuit ensures that the current generator is in the predetermined stable state, and a second state when the start-up current is applied.

13. A current generator and a start-up circuit according to claim 1, wherein said prevention circuit prevents said application circuit from applying the start-up current a predetermined time after the start-up current is initially applied.

14. A current generator and a start-up circuit according to claim 1, wherein said prevention circuit detects when the current generator is in a stable state in which current is conducting, and stops application of the start-up current once it has been detected that the current generator is in the stable state.

15. A start-up circuit for use with a bias current generator, the start-up circuit comprising:

an application circuit consuming power while applying a start-up current to the bias current generator and consuming substantially no power otherwise;

an ensuring circuit ensuring that the bias current generator is in a predetermined stable state before the start-up current is applied thereto; and a prevention circuit for stopping application of the start-up current to the bias current generator after the start-up current is initially applied so that said application circuit then consumes substantially no power.

16. A start-up circuit according to claim 15, wherein said ensuring circuit prevents a flow of current in the bias current generator prior to application of the start-up current so that the stable state is one in which current is not flowing.

17. A start-up circuit according to claim 15, wherein said prevention circuit prevents said application circuit from applying the start-up current a predetermined time after the start-up current is initially applied.

18. A start-up circuit according to claim 15, wherein said prevention circuit detects when the bias current generator is in a stable state in which current is conducting, and stops application of the start-up current once it has been detected that the bias current generator is in the stable state.

19. A start-up circuit according to claim 16, wherein said ensuring circuit applies a voltage to the bias current generator so that the bias current generator is not conducting.

20. A start-up circuit according to claim 15, wherein said ensuring circuit comprises at least one transistor.

21. A start-up circuit according to claim 15, wherein said ensuring circuit comprises at least one transistor connected to the bias current generator for applying a voltage to the bias current generator so that the bias current generator is not conducting.

22. A start-up circuit according to claim 15, wherein said ensuring circuit comprises a first and a second transistor, wherein said first transistor ensures a first portion of the bias current generator is conducting prior to application of the start-up current, and said second transistor ensures that a second portion of the bias current generator is not conducting prior to application of the start-up current.

23. A start-up circuit according to claim 15, wherein said application circuit comprises a capacitive element.

24. A start-up circuit according to claim 23, wherein said ensuring circuit ensures that the bias current generator is in the predetermined stable state when in operation; wherein said capacitive element is charged and the start-up current is provided when said capacitive element is discharged.

25. A start-up circuit according to claim 23, wherein said capacitive element comprises a capacitor.

26. A start-up circuit according to claim 23, wherein said capacitive element comprises a transistor.

27. A start-up circuit according to claim 15, wherein said application circuit comprises a transistor having a gate for receiving a start signal, the start signal has a first state when said ensuring circuit ensures that the bias current generator is in the predetermined state, and a second state when the start-up current is applied to the bias current generator.

28. A start-up circuit according to claim 15, wherein operation of the start-up circuit is controlled by a control signal having a first state when said ensuring circuit ensures that the bias current generator is in the predetermined stable state, and a second state when the start-up current is applied.

29. A bias current generator and a start-up circuit connected thereto and comprising:

a first pair of transistors having a first channel type, said first pair of transistors comprising a first and a second transistor;

a second pair of transistors having a second channel type, said second pair of transistors comprising a third and a fourth transistor;

an output for providing a bias current; and a resistive element, said first transistor being connected to said third transistor defining a first series path, said second transistor being connected to said fourth transistor defining a second series path; said output being defined by the series paths; said second transistor being unmatched with said first transistor or said fourth transistor being unmatched with said third transistor so that said second or fourth transistor has less gain than said respective first or third transistor; said resistive element being connected in series with the second series path so that a state of equilibrium is achieved;

an application circuit applying a start-up current to said first and second pairs of transistors; and an ensuring circuit ensuring that said first and second pairs of transistors are in a predetermined stable state before the start-up current is applied thereto.

30. A current generator and a start-up circuit according to claim 29, wherein said ensuring circuit comprises a first and second transistor; wherein said first transistor ensures said first pair of transistors is conducting prior to application of the start-up current and said second transistor ensures that said second pair of transistors is not conducting prior to application of the start-up current.

31. A current generator and a start-up circuit according to claim 29, wherein said application circuit comprises a capacitive element.

32. A current generator and a start-up circuit according to claim 31, wherein said ensuring circuit ensures that the current generator is in the predetermined stable state when in operation; and wherein said capacitive element is charged and the start-up current is provided when said capacitive element is discharged.

33. A current generator and a start-up circuit according to claim 29, wherein said application circuit comprises a transistor having a gate for receiving a start signal, the start signal has a first state when said ensuring circuit ensures that the current generator is in the predetermined state, and a second state when the start-up current is applied to the current generator.

34. A current generator and a start-up circuit according to claim 29, wherein operation of said start-up circuit is controlled by a control signal having a first state when said ensuring circuit ensures that the current generator is in the predetermined stable state, and a second state when the start-up current is applied.

35. A current generator and a start-up circuit according to claim 29, wherein said application circuit comprises a prevention circuit preventing said application circuit from applying the start-up current a predetermined time after the start-up current is initially applied.

36. A current generator and a start-up circuit according to claim 29, wherein said application circuit comprises a prevention circuit detecting when the current generator is in a stable state in which current conducts and stops application of the start-up current once it has been detected that the current generator is the stable state.

37. A current generator and a start-up circuit according to claim 29, wherein said second transistor comprises a gate connected to said output.

38. A current generator and a start-up circuit according to claim 29, wherein said first transistor comprises a gate connected to the first series path.

39. A current generator and a start-up circuit according to claim 29, further comprising an input receiving a start-up current, said input connected to the first series path.

40. A method for applying a start-up current to a current generator, the method comprising the steps of:

ensuring that the current generator is in a predetermined stable state;

applying the start-up current to the current generator using an application circuit when the current generator is in the predetermined stable state, the application circuit consuming power while applying the start-up current and consuming substantially no power otherwise; and stopping application of the start-up current to the current generator after the start-up current is initially applied so that the application circuit then consumes substantially no power.

41. A method according to claim 40, wherein the step of ensuring comprises preventing a flow of current in the current generator prior to application of the start-up current so that the stable state is one in which current is not conducting.

42. A method according to claim 40, wherein the step of applying uses an application circuit comprising a capacitive element, the method further comprising the step of charging the capacitive element and providing the start-up current when the capacitive element is discharged.

43. A method according to claim 40, wherein the step of applying uses an application circuit comprising a transistor having a gate for receiving a start signal, the start signal has a first state when the current generator is in the stable state, and a second state when the start-up current is applied to the current generator.

44. A method according to claim 40, wherein the step of applying is controlled by a control signal having a first state when the current generator is in the stable state, and a second state when the start-up current is applied.

45. A method according to claim 40, wherein the start-up current is removed a predetermined time after the start-up current is initially applied.

* * * * *